Nov. 15, 1938. G. F. LAING 2,136,695
MOTOR CONTROL SYSTEM
Filed Dec. 20, 1937
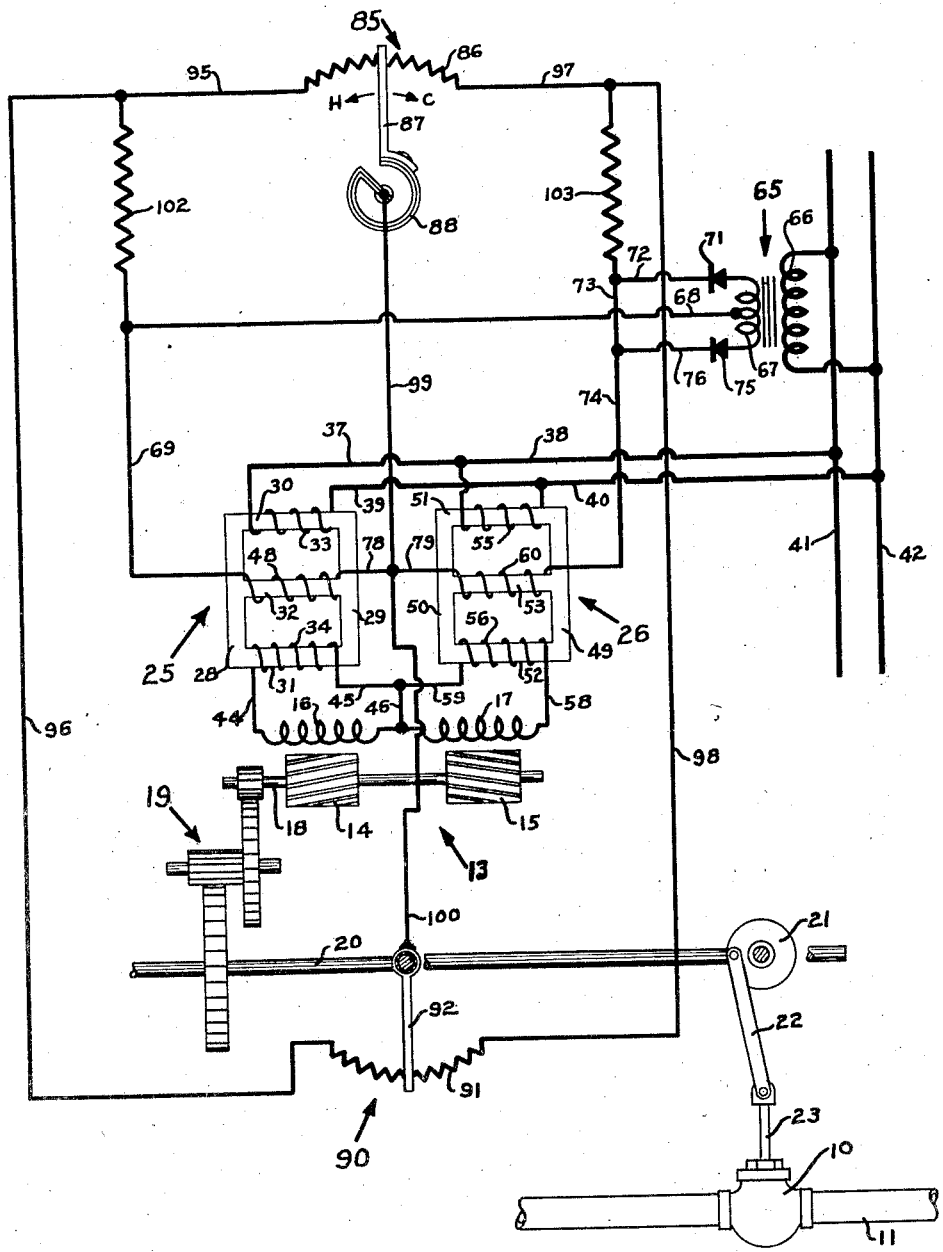
Inventor
Gordon F. Laing
By
George H. Fisher
Attorney Patented Nov. 15, 1938

2,136,695

UNITED STATES PATENT OFFICE 2,136,695

MOTOR CONTROL SYSTEM

Gordon F. Laing, Minneapolis, Minn., assignor to Minneapolis-Honeywell Regulator Company, Minneapolis, Minn., a corporation of Delaware Application December 20, 1937, Serial No. 180,768

16 Claims. (Cl. 172—239)

The present invention relates to a motor control system and more particularly to one of the follow-up type wherein a motor always moves to a position corresponding to that of a control impedance.

It is quite common to use a motor control system wherein the position of a motor is varied by means of a control impedance, which cooperates with a follow-up impedance positioned by the motor to cause the motor to run to a position corresponding to that of the control impedance. One common form which such systems have taken in the prior art is that in which the control impedance and the rebalancing impedance are connected in a normally balanced network which controls the energization of a balanced relay, which relay in turn controls the energization of the motor. The difficulty with such systems is that the relay requires a certain amount of differential in order to successfully operate, and such differential materially reduces the possible number of steps. This difficulty can be overcome by an arrangement of vacuum tubes or other space discharge amplifiers, but such devices are inherently expensive and of limited life so as to greatly increase the maintenance cost of the apparatus employing them.

An object of the present invention is to provide a follow-up motor control system wherein the control of the motor in accordance with the values of the control and follow-up impedances is accomplished by means of a saturable core amplifier.

A further object of the invention is to provide such a follow-up system in which a reversible motor having opposed windings is employed and in which the relative energization of the two values is controlled in accordance with the control and follow-up impedances by a pair of saturable core amplifiers.

A further object of the present invention is to provide a follow-up system of the type set forth in the previous objects in which the saturable core amplifiers are in the form of saturable core transformers.

Other objects of the invention will be apparent from a consideration of the accompanying specification, claims and drawing.

In the single figure of the drawing, the improved motor control system is shown in schematic form. This system is shown in connection with a temperature control system although it is to be understood that the invention is not so limited.

Referring to the drawing, a valve is indicated by the reference numeral 10. This valve is merely illustrative of an object which may be driven by the motor and is shown as controlling the flow of steam through the steam line 11 leading to radiators or other steam utilizing devices.

The valve 10 is variably positioned by a motor generally indicated by the reference numeral 13. This motor is of the reversible induction type and is shown as comprising two opposed rotors 14 and 15 with which are associated field windings 16 and 17, respectively. As long as these two field windings are equally energized, the motor rotates in neither direction but upon one field winding becoming more highly energized than the other the motor rotates in one direction or the other depending upon which field winding is more highly energized. The rotors 14 and 15 are secured to a shaft 18. The shaft 18 is connected through a reduction gear train 19 to a shaft 20, which has secured thereto a crank disc 21 which is connected through a crank arm 22 to the stem 23 of the valve 10. The valve is so designed that clockwise rotation of shaft 20 and consequently of crank disc 21 will cause valve 10 to be moved towards open position and that counter-clockwise movement of crank disc 21 will cause the valve to move towards closed position.

The energization of motor field windings 16 and 17 is controlled by two saturable core amplifiers 25 and 26. The saturable core amplifier 25 consists of a rectangular frame having side legs 28 and 29 and cross legs 30 and 31. The frame is also provided with a shunt leg 32. Located on the legs 30 and 31 are primary and secondary windings 33 and 34. The primary winding 33 is connected through conductors 37, 38, 39, and 40 to two line wires 41 and 42 leading to a suitable source of power (not shown). The secondary 34 is connected by conductors 44, 45, and 46 to field winding 16. A saturating winding 48 is located on the shunt leg 32. The saturable core amplifier 26 is identical in structure to that of core 25 having side legs 49 and 50, outside cross legs 51 and 52, and a shunt leg 53. This amplifier similarly has a primary winding 55 on the cross leg 51 and a secondary winding 56 on the cross leg 52. The primary winding 55 is connected through conductors 38 and 40 to line wires 41 and 42. The secondary winding 56 is connected through conductors 58, 59, and 46 to the field winding 17. On the shunt core 53 a saturating winding 60 is located.

The saturating windings 48 and 60 are energized by direct current. A step-down transformer 65 is employed for this purpose. This transformer comprises a line voltage primary 66 connected to the line wires 41 and 42 and a center tapped low voltage secondary 67. The center tap of secondary 67 is connected through conductor 68 with a conductor 69 leading to one terminal of saturating winding 48. The upper terminal of secondary 67 is connected through a rectifier 71 and conductors 72, 73, and 74, to one terminal of saturating winding 60. The lower terminal of secondary 67 is likewise connected to the same terminal of saturating winding 60 through a rectifier 75 and conductors 76 and 74. The rectifiers 71 and 75 may be of any conventional type such as the common copper oxide rectifiers. The center tapped secondary 67 in conjunction with the rectifiers 71 and 75 act to give full wave rectification in the conventional manner. The saturating windings 48 and 60 are connected together at their inner terminals by conductors 78 and 79. Thus when the current is flowing in one direction in secondary 67, the following circuit is established to the saturating windings 48 and 60: from the upper terminal of secondary 67 through rectifier 71, conductors 72, 73, and 74, saturating winding 60, conductors 79 and 78, saturating winding 48 and conductors 69 and 68 to the center tap of secondary 67. Current is prevented from flowing in the other half by reason that such flow could not be passed by rectifier 75. When the current is flowing in the opposite direction the following circuit is established through saturating windings 60 and 48: from the lower half of secondary 67 through the rectifier 75, through conductors 76 and 74, saturating winding 60, conductors 79 and 78, saturating winding 48, and conductors 69 and 68 to the center tap of secondary 67. Thus, at all times, the current flow through windings 60 and 48 is in the same direction.

The relative energization of the two windings 48 and 60 is controlled by two potentiometers 85 and 90. The potentiometer 85 constitutes the control potentiometer and is shown as comprising a resistance 86 and a contact arm 87. The arm 87 may be actuated in any desired manner. For purposes of illustration, the arm 87 is shown in the drawing as actuated by a bimetallic element 88 responsive to a temperature change which it is desired to have control the operation of the radiator or other steam utilizing device receiving the steam through pipe 11.

The potentiometer 90 constitutes the follow-up potentiometer and is used to limit the movement of the motor to that called for by the control impedance. This potentiometer comprises a resistance 91 and a contact arm 92. The contact arm 92 is secured to shaft 20 so as to be movable therewith. Thus upon movement of the shaft 20 in a direction to effect clockwise movement of crank disc 21, the arm 92 is similarly moved in a clockwise direction towards the left of resistance 90. Upon an opposite rotation of shaft 20, an opposite movement of contact arm 92 takes place.

The potentiometers 85 and 90 are connected in parallel with each other. The left hand ends of resistances 86 and 91 are connected together through conductors 95 and 96. Similarly, the right hand ends of these two resistances are connected through conductors 97 and 98. The contact arm 87 is connected to the contact arm 92 through bimetallic element 88 and conductors 99 and 100. The potentiometers 85 and 90 are not only connected in parallel with each other but they are also connected in parallel with the saturating windings 48 and 60. Thus the left hand end of resistor 86 is connected to the left hand terminal of saturating winding 48 through conductor 95, protective resistance 102, and conductor 69. Similarly the right hand terminal resistor 86 is connected to the right hand terminal of saturating winding 60 through the conductor 97, the protective resistance 103 and conductor 74. The contact arm 87 is connected through bimetallic element 88 and conductor 99 to conductors 78 and 79 which electrically connect the saturating windings 48 and 60. In view of the fact that potentiometer 86 is connected parallel with the windings 48 and 60 and inasmuch as the potentiometer 90 is connected in parallel with potentiometer 85, it will be obvious that the two potentiometers 85 and 90 are both connected in parallel with the windings 48 and 60. These two potentiometers thus act as voltage dividers to determine the relative voltages across saturating windings 48 and 60 and to hence determine the relative current flow therethrough. Thus, whenever the contact arm 87 is moved to the left the voltage across saturating winding 48 is decreased and that across saturating winding 60 is increased. The result is that the current through winding 48 becomes less than that through winding 60. An opposite movement of contact arm 87 causes an opposite unbalance in the energization of saturating windings 48 and 60. The same effect upon the relative energization of windings 48 and 60 is produced by a movement of contact arm 92. Thus any unbalance in the energization of saturating windings 48 and 60 can be compensated for by an opposite movement of contact arm 92 of rebalancing potentiometer 90.

The protective resistances 102 and 103 are for the purpose of insuring against a short-circuiting of the transformer when the contact arms of the two potentiometers are in their opposite extreme position. Thus the following circuit is established when arm 87 is in its extreme left position and arm 92 in its extreme right position: from the upper terminal of secondary 67 through rectifier 71, conductor 72, resistor 103, conductor 98, contact arm 92, conductor 100, bimetallic element 88, contact arm 87, conductor 95, resistor 102, and conductor 68 to the center tap of secondary 67. Were it not for the presence of resistors 102 and 103 this circuit would short-circuit the transformer, which, of course, would be undesirable.

The energization of the saturating windings 48 and 60 controls the amount of flux, produced by primaries 33 and 55, which is by-passed through the shunt legs 32 and 53. As a result, the energization of the saturating windings 48 and 60 controls the output of secondaries 34 and 56. By operating the saturating windings 48 and 60 in such a manner that the shunt legs 32 and 53 are operated at a proper portion of the saturation curve, a relatively small change in the current flow through one of the saturating windings will produce quite a large change in the output of the secondary. The result is that the relatively large amount of power utilized by field windings 16 and 17 can be controlled by a relatively small current through the saturating windings 48 and 60.

Operation

The various elements of this system are shown in the position assumed when the temperature to which bimetallic element 88 is responsive is at or about the desired value. The bimetallic element 88 is so disposed that a fall in temperature causes the contact arm 87 to move to the right and a rise in temperature causes the contact arm to move to the left. Let it be assumed that the temperature in the space begins to drop causing a movement of contact arm 87 to the right.

This results, as previously explained, in saturating winding 60 becoming less highly energized than saturating winding 48. This in turn results in the output of secondary 56 becoming less than that of secondary 34. The result is that field winding 16 becomes more highly energized than field winding 17 causing the motor to rotate in one direction. The apparatus is so designed that this direction is such that the shaft 20 is rotated in a clockwise direction, causing clockwise rotation of crank disc 21. This clockwise rotation of crank disc 21 causes valve 10 to be moved toward open position admitting a greater amount of steam to flow through pipe 11.

At the same time as the rotation of shaft 20 is effecting a clockwise rotation of crank disc 21, it is also causing arm 92 to move in a clockwise direction or towards the left of resistance 91. It will be noted that this movement to the left is in an opposite direction to the movement of contact arm 87 which initiated the operation of the motor. The result is that this movement of contact arm 92 after it is carried sufficiently far results in the saturating windings 48 and 60 again being equally energized and also in the secondary windings 34 and 56 furnishing an equal output. Windings 17 and 16 thus again become equally energized so that the motor remains stationary. The apparatus is so designed that the movement of the motor that takes place before this rebalance occurs corresponds to the movement desired for the change in position of contact arm 87 which initiated such movement.

With the valve in a wider open position, more steam is being admitted to the radiators or other steam utilizing devices with the result that the temperature to which bimetallic element 88 is subjected begins to rise. This results in a movement of contact arm 87 to the left. The effect of this is to cause saturating winding 60 to become more highly energized than saturating winding 48, as previously explained. The result of this is that the output of secondary 56 becomes greater than that of secondary 34; consequently field winding 17 becomes more highly energized than field winding 16, causing the motor to rotate in a direction opposite to that previously described. The result is that the motor now rotates in a direction to cause crank disc 21 to be rotated in a counter-clockwise direction moving valve 10 towards its closed position. At the same time the contact arm 92 is moved towards the right in a counter-clockwise direction. This movement of contact arm 92 has an effect opposite to the movement of contact arm 87 to the left. The result is that after this movement of contact arm 92 has taken place by an amount corresponding to the deflection of contact arm 87 which initiated the movement of arm 87, the saturating windings 48 and 60 will again be equally energized to cause an equalization in the energization of the motor field windings 16 and 17.

Thus it will be noted that at all times the position of motor 13 and consequently of the object controlled thereby corresponds to the position assumed by the contact arm of the controlling potentiometer. This system moreover requires no differential beyond the small amount required to effect reversal of the gear train. Moreover the transmission of the unbalance in the energization of the system consisting of the control and rebalancing impedances, to the motor is accomplished without the use of any moving parts or with any parts of limited life.

While the invention has been described in connection with the use of potentiometers as the control impedances, it will be obvious that other impedance elements can be substituted therefor. It will also be obvious that various other changes can be made in the apparatus shown within the scope of the appended claims. It is to be understood that the specific form of the apparatus shown is for purposes of illustration only.

I claim as my invention:

1. In a motor control system, an electrical motor, a variable control impedance, a variable follow-up impedance, means connecting said variable follow-up impedance to said motor and operative to vary the value of said impedance in accordance with the position of said motor, a saturable core amplifier having a magnetic core structure and output and saturating windings on said core structure, means connecting said saturating winding with said control and follow-up impedances to a source of power and operative to energize said saturating winding in accordance with the values of both said control impedance and said follow-up impedance, and means controlled by said output winding for controlling the energization of said motor.

2. In a motor control system, an electrical motor, a variable control impedance, a variable follow-up impedance, means connecting said variable follow-up impedance to said motor and operative to vary the value of said impedance in accordance with the position of said motor, a saturable core amplifier having a magnetic core structure and output and saturating windings on said core structure, means connecting said saturating winding with said control and follow-up impedances to a source of power and operative to energize said saturating winding in accordance with the values of both said control impedance and said follow-up impedance, and means including said output winding for energizing said motor.

3. In a motor control system, an electrical motor, a variable control impedance, a variable follow-up impedance, means connecting said variable follow-up impedance to said motor and operative to vary the value of said impedance in accordance with the position of said motor, a saturable core transformer having a magnetic core structure comprising at least three legs one of which constitutes a magnetic shunt with respect to the other legs, a saturating winding on said shunt leg and primary and secondary windings on said other legs, means connecting said primary winding to a source of power, means connecting said saturating winding with said control and follow-up impedances to a source of power and operable to energize said saturating winding in accordance with the values of both said control impedance and said follow-up impedance and means controlled by said secondary winding for controlling the energization of said motor.

4. In a motor control system, an electrical motor, a variable control impedance, a variable follow-up impedance, means connecting said variable follow-up impedance to said motor and operative to vary the value of said impedance in accordance with the position of said motor, a saturable core transformer having a magnetic core structure comprising at least three legs, one of which constitutes a magnetic shunt with respect to the other legs, a saturating winding on said shunt leg and primary and secondary windings on said other legs, means connecting said primary winding to a source of power, means connecting said saturating winding with said control and follow-up impedances to a source of power and operable to energize said saturating winding in accordance with the values of both said control impedance and said follow-up impedance and circuit connections between said secondary and said motor.

5. In a motor control system, an electrical motor, a variable control impedance, a variable follow-up impedance, a saturable core amplifier having a magnetic core structure and output and saturating windings on said core structure, a source of power, means to connect said saturating winding and said control and follow-up impedances to said cource of power in parallel with each other, whereby the energization of said saturating winding is controlled by the combined values of said two impedances, means controlled by said output winding for controlling energization of said motor, and means operatively connected with said motor for varying the value of said follow-up impedance in a direction opposite to the change in the value of the control impedance which produced the movement of the motor.

6. In a motor control system, an electrical motor, a variable control impedance, a variable follow-up impedance, a balanced impedance network comprising said impedances, a saturable core amplifier having a magnetic core structure and output and saturating windings on said core structure, a source of power, means connecting said saturating winding with said impedance network to said source of pewer in such a manner that the energization of said saturating winding is controlled by the amount of unbalance of said network, means controlled by said output winding for controlling the energization of said motor, and means operatively connected with said motor for varying the value of said follow-up impedance in a direction and to an extent to rebalance the impedance network.

7. In a motor control system, a reversible electrical motor having two energizing circuits, the energization of one of which tends to cause the motor to rotate in one direction and the energization of the other of which tends to cause the motor to rotate in the opposite direction, a variable control impedance, a variable follow-up impedance, a balanced impedance network comprising said impedances, a saturable core amplifier having a magnetic core structure and output and saturating windings on said core structure, a source of power, means connecting said saturating winding with said impedance network to said source of power in such a manner that the energization of said saturating winding is controlled by the amount of unbalance of said network, means including said output winding for controlling the energization of one of said energizing circuits of said motor to control the extent and direction of rotation of said motor, and means operatively connected with said motor for varying the value of said follow-up impedance in a direction and to an extent to rebalance the impedance network.

8. In a motor control system, a reversible electrical motor having two opposed field windings which upon energization thereof tend to cause rotation of the motor in opposite directions, an energizing circuit for each of said field windings, a variable control impedance, a variable follow-up impedance, a balanced impedance network comprising said impedances, a saturable core amplifier having a magnetic core structure and output and saturating windings on said core structure, a source of power, means connecting said saturating winding with said impedance network to said source of power in such a manner that the energization of said saturating winding is controlled by the amount of unbalance of said network, means including said output winding for controlling the energization of one of said field winding energizing circuits to control the extent and direction of rotation of said motor, and means operatively connected with said motor for varying the value of said follow-up impedance in a direction and to an extent to rebalance the impedance network.

9. In a motor control system, a reversible electrical motor having two energizing circuits, the energization of one of which tends to cause the motor to rotate in one direction and the energization of the other of which tends to cause the motor to rotate in the opposite direction, a variable control impedance, a variable follow-up impedance, a balanced impedance network comprising said impedances, a pair of saturable core amplifiers, each having a magnetic core structure and output and saturating windings on said core structure, a source of power, means connecting said saturating windings with said impedance network to said source of power in such a manner that when said network is balanced said saturating windings are equally energized and when said network is unbalanced, one of said saturating windings is more highly energized than the other, depending upon the direction of unbalance, means including one of said output windings for controlling each of said motor energizing circuits, and means operatively connected with said motor for varying the value of said follow-up impedance in a direction and to an extent to rebalance the impedance network.

10. In a motor control system, a reversible electrical motor having two opposed field windings which upon energization thereof tend to cause rotation of the motor in opposite directions, an energizing circuit for each of said field windings, a variable control impedance, a variable follow-up impedance, a balanced impedance network comprising said impedances, a pair of saturable core amplifiers, each having a magnetic core structure and output and saturating windings on said core structure, a source of power, means connecting said saturating windings with said impedance network to said source of power in such a manner that when said network is balanced said saturating windings are equally energized and when said network is unbalanced, one of said saturating windings is more highly energized than the other, depending upon the direction of unbalance, means including one of said output windings for controlling each of said field winding energizing circuits, and means operatively connected with said motor for varying the value of said follow-up impedance in a direction and to an extent to rebalance the impedance network.

11. In a motor control system, a reversible electrical motor having two energizing circuits, the energization of one of which tends to cause the motor to rotate in one direction and the energization of the other of which tends to cause the motor to rotate in the opposie direction, a control potentiometer, a follow-up potentiometer, each of which comprises a relatively movable contact member and potentiometer, a pair of saturable core amplifiers, each having a magnetic core structure and output and saturating windings on said core structure, a source of power, means connecting said saturating windings in series with each other and in parallel with said control and follow-up potentiometers to said source of power to form a normally balanced network in which said saturating windings are equally energized, means including one of said output windings for controlling each of said motor energizing circuits, and means operatively connected with said motor for varying the setting of said follow-up potentiometer in a direction and to an extent to rebalance the impedance network.

12. In a motor control system, a reversible electrical motor having two opposed field windings which upon energization thereof tend to cause rotation of the motor in opposite directions, an energizing circuit for each of said field windings, a control potentiometer, a follow-up potentiometer, each of which comprises a relatively movable contact member and potentiometer, a pair of saturable core amplifiers, each having a magnetic core structure and output and saturating windings on said core structure, a source of power, means connecting said saturating windings in series with each other and in parallel with said control and follow-up potentiometers to said source of power to form a normally balanced network in which said saturating windings are equally energized, means including one of said output windings for controlling each of said field winding energizing circuits, and means operatively connected with said motor for varying the setting of said follow-up potentiometer in a direction and to an extent to rebalance the impedance network.

13. In a motor control system, a reversible electrical motor having two energizing circuits, the energization of one of which tends to cause the motor to rotate in one direction and the energization of the other of which tends to cause the motor to rotate in the opposite direction, a control potentiometer, a follow-up poteniometer, each of which comprises a relatively movable contact member and potentiometer, a pair of saturable core transformers, each having a magnetic core structure comprising at least three legs one of which constitutes a magnetic shunt with respect to the other legs, a saturating winding on said shunt leg and primary and secondary windings on said other legs, means connecting said primary windings to a source of alternating current power, a source of direct current power, means connecting said saturating windings in series with each other and in parallel with said control and follow-up potentiometers to said direct current source of power to form a normally balanced network in which said saturating windings are equally energized, means including one of said secondary windings for controlling each of said field winding energizing circuits, and means operatively connected with said motor for varying the setting of said follow-up potentiometer in a direction and to an extent to rebalance the impedance network.

14. In a motor control system, a reversible electrical motor having two opposed field windings which upon energization thereof tend to cause rotation of the motor in opposite directions, an energizing circuit for each of said field windings, a control potentiometer, a follow-up potentiometer, each of which comprises a relatively movable contact member and potentiometer, a pair of saturable core transformers, each having a magnetic core structure comprising at least three legs one of which constitutes a magnetic shunt with respect to the other legs, a saturating winding on said shunt leg and primary and secondary windings on said other legs, means connecting said primary windings to a source of alternating current power, a source of direct current power, means connecting said saturating windings in series with each other and in parallel with said control and follow-up potentiometers to said direct current source of power to form a normally balanced network in which said saturating windings are equally energized, means including one of said output windings for controlling each of said field winding energizing circuits, and means operatively connected with said motor for varying the setting of said follow-up potentiometer in a direction and to an extent to rebalance the impedance network.

15. In a motor control system, an electrical motor, a variable control impedance, condition responsive means for adjusting the value of said control impedance, a variable follow-up impedance, means connecting said variable follow-up impedance to said motor and operative to vary the value of said impedance in accordance with the position of said motor, a saturable core amplifier having a magnetic core structure and output and saturating windings on said core structure, means connecting said saturating winding with said control and follow-up impedances to a source of power and operative to energize said saturating winding in accordance with the values of both said control impedance and said follow-up impedance, and means controlled by said output winding for controlling the energization of said motor.

16. In a motor control system, a reversible electrical motor having two energizing circuits, the energization of one of which tends to cause the motor to rotate in one direction and the energization of the other of which tends to cause the motor to rotate in the opposite direction, a control potentiometer, a follow-up potentiometer, each of which comprises a relatively movable contact member and potentiometer, condition responsive means for controlling the setting of said control potentiometer, a pair of saturable core amplifiers, each having a magnetic core structure and output and saturating windings on said core structure, a source of power, means connecting said saturating windings in series with each other and in parallel with said control and follow-up potentiometers to said source of power to form a normally balanced network in which said saturating windings are equally energized, means including one of said output windings for controlling each of said motor energizing circuits, and means operatively connected with said motor for varying the setting of said follow-up potentiometer in a direction and to an extent to rebalance the impedance network.

GORDON F. LAING.

DISCLAIMER 2,136,695.—*Gordon F. Laing*, Minneapolis, Minn. MOTOR CONTROL SYSTEM. Patent dated November 15, 1938. Disclaimer filed February 20, 1940, by the assignee, *The Brown Instrument Company*.

Hereby enters this disclaimer to claims 1, 2, 6, 7, and 15 in said specification.

[*Official Gazette March 12, 1940.*]

DISCLAIMER 2,136,695.—*Gordon F. Laing*, Minneapolis, Minn. MOTOR CONTROL SYSTEM. Patent dated November 15, 1938. Disclaimer filed May 9, 1941, by the assignee, *The Brown Instrument Company*.

Hereby enters this disclaimer to claims 8, 9, and 10 in said specification.

[*Official Gazette June 10, 1941.*]